UNITED STATES PATENT OFFICE.

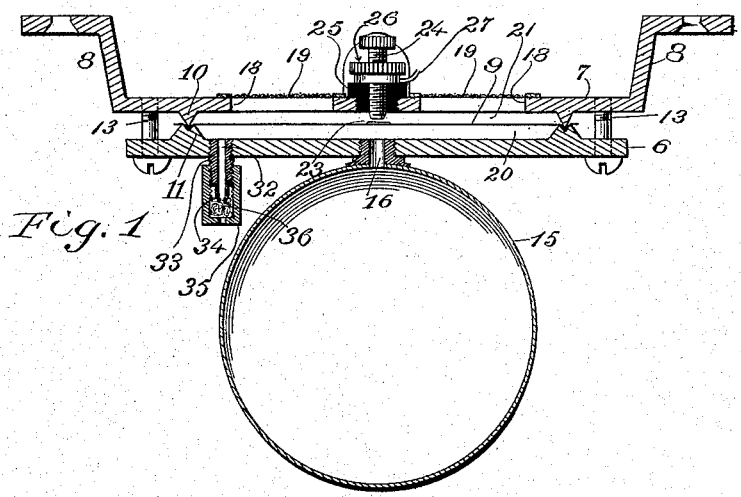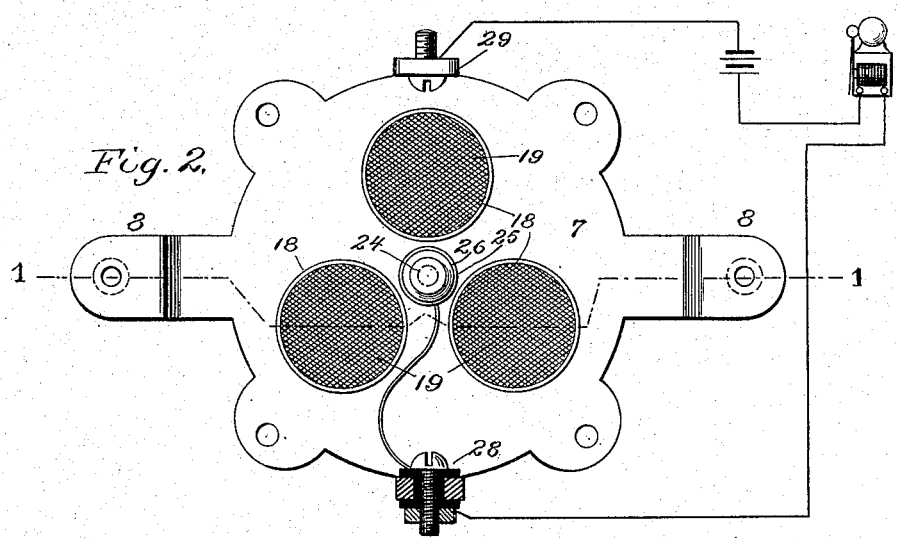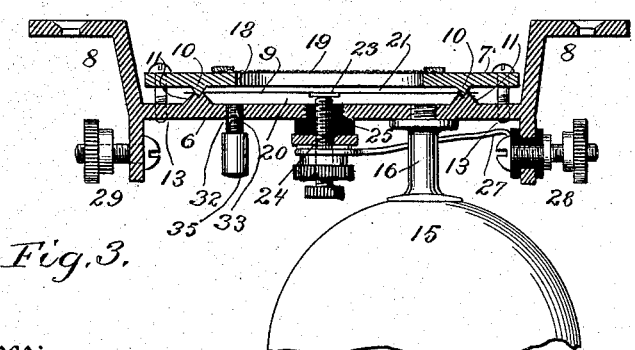

VITALIS HIMMER, JR., OF BAYONNE, NEW JERSEY, ASSIGNOR, BY MESNE ASSIGNMENTS, TO THE BURCHELL-JOHNSTON CORPORATION, A CORPORATION OF NEW YORK.

THERMOSTATIC CONTROLLER.

1,174,149.     Specification of Letters Patent.     Patented Mar. 7, 1916.

Application filed March 25, 1913. Serial No. 756,656.

*To all whom it may concern:*

Be it known that I, VITALIS HIMMER, Jr., a citizen of the United States, residing at Bayonne, in the county of Hudson and State of New Jersey, have invented a certain new and useful Improvement in Thermostatic Controllers, of which the following is a specification.

This invention relates to thermostatic controllers or that class of apparatus operated by temperature changes for operating or otherwise controlling alarm systems, sprinkler systems or any other systems.

More particularly, this invention relates to that class of thermostatic controller which operates by the volumetric changes of an inclosed fluid, for example, atmospheric air, whose expansion and contraction are the direct results of heat applied to or detracted from the body of air.

The general objects of the present invention are to afford a more durable, permanent, efficient, compact, simple and cheap thermostatic controller than those heretofore known.

A specific object hereof is to afford a sensitive and durable thermostatic controller of the type wherein operation is caused by relatively abrupt temperature changes rather than by the actual existing temperature or by any relatively gradual changes therein. By these expressions it will be understood that usually such a thermostatic controller is to be self-adjustable so as to avoid operation upon ordinary climatic changes or ordinary temperature adjustments within a building, whereas for a sudden temperature change, such as the breaking out of a conflagration, the controller will operate to give an alarm, open a water supply or perform other operations.

Other and more specific objects will be illustrated in the hereinafter following description of a particular embodiment of the present invention.

In the accompanying drawings forming a part hereof, Figure 1 is a section on the plane 1—1 of Fig. 2 of a thermostatic controller embodying the present invention. For convenience, the apparatus may be considered as attached to the ceiling of a room, so that the figure is a vertical central section. Fig. 2 is a plan view of the device shown in Fig. 1. Fig. 3 is a view similar to Fig. 1 of a modification involving a normally closed, instead of open, electric circuit.

In order to inclose a body of air an air chamber is provided in an apparatus of this kind. This is in effect a fluid-expansion chamber since the operation of the device is due to volumetric expansion or contraction of the fluid in the chamber. In connection therewith is provided some suitable control device operated by volumetric changes of the fluid due to temperature changes outside the chamber, and this device may, for convenience, be illustrated as taking the form of an electric contact device, which affords delicate and easily regulated control, although mechanical and other forms of control device could obviously be used. Apparatuses of this general nature have been already known and it has already been suggested to provide a restricted air escape permitting air to flow to and fro from or into the chamber for equalizing the interior and exterior pressures due to gradual volumetric changes.

In the present invention there is provided in connection with the air chamber a novel form of vent for equalizing gradual volume or pressure changes, the same simply and cheaply constructed of merely two pieces, namely, a hollow stem removably attached to the wall of the apparatus and a compression cap adjustable upon the stem, so that porous material may be confined between them to constitute a restriction against free air flow but to permit a limited air flow. Such an air escape not only possesses the mentioned advantages, but is easily removable and replaceable, while the adjustment permits regulation of flow restriction and any clogging of the apparatus is confined entirely to the porous material or cotton, which, upon becoming clogged with impurities, may be at will replaced by a fresh supply. The device is in the nature of an air valve.

Referring to the drawings the substantial or frame parts of the apparatus may comprise a pair of rigid frame plates, 6 below and 7 above. These plates together form a housing providing interior spaces, and they will preferably be horizontally arranged, one of them having upwardly extending lugs 8 by which the apparatus may be removably attached to a ceiling.

The opposed housing plates form a convenient mode of mounting a movable diaphragm 9, which is shown hermetically confined between the plates by means of an annular tongue 10 upon the upper plate engaging with a grooved rib 11 upon the under plate, the diaphragm clamped between them under tension. It will be understood that the diaphragm is to be moved by expansion or contraction, as hereinafter recited, and is to afford electrical contact as a means of controlling a signal bell or other apparatus. To firmly secure together the housing plates 6 and 7 a series of bolts 13 may be employed, extending through one and engaged in the other. The two frame plates are recessed opposite the diaphragm and, in effect, the upper plate is a means for clamping the diaphragm hermetically against the lower plate. It will be seen that the diaphragm divides the interior into two spaces, with one of which, namely the lower, is connected an air expansion chamber 15, this being shown as a thin-walled spherical shell having a screw-threaded connecting nipple 16 by which it may be removably and hermetically engaged with the lower frame plate 6, so as to effect communication between the air chamber 15 and the space adjacent the diaphragm. Expansion of air in the air chamber tends to lift the diaphragm. The upper housing plate 7 is shown formed with unrestricted apertures 18 of considerable size, these being covered with dust excluding fabric or filter 19, which permits free communication with the outer atmosphere. I thus have a structure in which the diaphragm 9 is held so as to afford an air pressure space or diaphragm chamber 20 below it communicating with the air chamber 15 and an air space or protective recess 21 above it, the latter having free communication with the outer atmosphere through the dust excluding fabric pieces 19.

Secured near the middle of the diaphragm is a contact button 23 protecting the thin metal of the diaphragm from injury. Opposed to the contact button on the diaphragm is a fixed contact or screw 24 adapted to coöperate with the contact button. In the first modification of Figs. 1 and 2, the contacts are normally slightly separated and come into contact with air expansion. When a normally closed circuit is desired, the position of the parts may be reversed, as in the Fig. 3 modification, so that, by maintaining the contacts normally touching, an increased air pressure will effect a separation, thus breaking the circuit. In either case the contact screw 24 may be considered a control device by which the operation of a signal or other apparatus is controlled through the diaphragm movements. In the first instance the contact screw 24 is mounted in the upper housing plate 7 by means of a rubber bushing 25. The contact screw is adjustable toward and from the contact button, and, when adjusted, is secured permanently in place by means of a lock nut 26. Conducting wires 27 from the contact screw 25 and 28 from a grounded lug or terminal 29 extend to a suitable source of current and to the bell or other apparatus to be controlled, thus completing the circuit, which is made and broken only by the movements of the diaphragm 9.

The adjustable air escape device or valve hereof is indicated generally at 32 and is relatively exaggerated to more clearly show its structure. The device is not only adjustable as to the extent of air restriction, but is bodily removable and replaceable, as explained. The device comprises a screw-threaded hollow stem 33 having a liberal and non-restrictive passage from end to end, but tapered at its outer extremity to a small opening 34, giving a slight amount of restriction at the extreme end. Surrounding the threaded stem 33 is the screw cap 35 which not only protects the delicate end of the stem, but serves as a means of adjustably compressing the porous material 36, such as cotton, between the narrowed extremity 34 of the stem and the perforated outer end of the cap. The adjustment of the compression cap packs or loosens the cotton, thus controlling the resistance to air flow. The entire device may be carefully made and adjusted in the laboratory, so that the user may discard an inoperative escape device and substitute a properly adjusted one.

The thermostatic controller shown in the drawings is a complete device in itself, requiring only electric circuits and source of current for its operation. In the first form a separate circuit for each instrument is requisite. For the second form several instruments may be placed in the same circuit. The instruments will be suitably distributed around the premises, preferably at the ceiling of various rooms, where sudden volumes of overheated air would accumulate. In any case the circuits would be so arranged that the operation of an alarm would indicate the location of a conflagration. By these means a fire is detected at the outset as soon as the first sudden temperature rise occurs, this expanding the air in the thin-walled chamber 15 and thus moving the diaphragm and operating the control device or contact 24. In case of need of repair, replacement or inspection, it will be seen that all the parts are easily removable and detachable and replaceable. The air chamber 15 is a delicate member capable of injury from blows, and its replaceability is a valuable feature. The frame plates carry all the other parts of the apparatus compactly and securely, and they in turn afford the means of securing to the ceiling, thus giving a very advantageous practical construction. The openings 18 in the upper frame plate or the single opening shown in Fig. 3 facilitate the manufacture of the instrument and assemblage, besides permitting free air flow subject to filtration by the fabric 19. The frame plate apertures constitute of it a sort of bridge or spider. In the Fig. 3 modification the contact screw 24 is fitted to the same frame plate as the expansion chamber 15, namely, the lower frame plate, and, therefore, an air-tight connection of soft rubber or the like is provided between the contact screw and the frame plate, preventing interference with the operation of the instrument by air leakage. If the air escape device 32 be entirely omitted, the instrument can be used for operating an alarm or the like at a designated predetermined temperature.

It will thus be seen that thermostatic controllers have been illustrated and described embodying the principles and attaining the objects and advantages before set forth and other advantages pertaining to the described structures will be apparent to those skilled in the art. Since many matters of arrangement, design, detail and other features may be variously modified without departing from the novel principles involved, no limitation to such features is intended excepting so far as set forth in the appended claims.

What is clamed is:

1. A thermostatic controller including in combination, a frame, a diaphragm, an air expansion chamber, a control device, arranged to cause the diaphragm to operate said device upon air expansion in said chamber, and an adjustable air-escape device giving restricted air passage between chamber and atmosphere, consisting of a hollow stem attachable to the frame and a screw cap adjustable to regulate air flow, and a body of compressible porous material between stem and cap.

2. A thermostatic controller including in combination, a rigid flat solid frame plate 6 having a low annular flange 11, a rigid base plate behind said frame plate and having a flange corresponding to said first flange for holding a diaphragm between the plates, said base plate constructed with a large aperture covered with an air filtering material which opposes no effective resistance to air passage, means detachably connecting said plates together with a diaphragm held between them, a flexible diaphragm held between said plates by said flanges and forming a shallow diaphragm chamber with said frame plate, a control contact device coöperating with said diaphragm, a thin walled hollow shell connected tightly to said frame plate and forming an expansion chamber communicating with said diaphragm chamber, said shell having an interior volume substantially larger than the volume of said shallow diaphragm chamber, and one of said plates having rigid rearwardly extending feet for rigidly mounting the entire contrivance against a supporting wall in such manner as to leave a secondary protecting chamber between the base plate and the wall.

VITALIS HIMMER, Jr.

Witnesses:
JOHN C. BUTTON,
ELEANOR M. BURNS.

Copies of this patent may be obtained for five cents each, by addressing the "Commissioner of Patents, Washington, D. C."